United States Patent [19]
Ott et al.

[11] Patent Number: 5,945,633
[45] Date of Patent: Aug. 31, 1999

[54] RACK MOUNTABLE CABLE DISTRIBUTION ENCLOSURE HAVING AN ANGLED ADAPTER PLATE BRACKET

[75] Inventors: Conrad L. Ott, Port Jefferson Station, N.Y.; Charles E. Maynard, Thomaston, Conn.

[73] Assignee: The Siemon Company, Watertown, Conn.

[21] Appl. No.: 08/963,451

[22] Filed: Nov. 3, 1997

Related U.S. Application Data

[63] Continuation-in-part of application No. 08/652,908, May 23, 1996.

[51] Int. Cl.$^6$ .................................................... H05K 5/02
[52] U.S. Cl. ...................... 174/59; 174/DIG. 9; 312/286; 379/326
[58] Field of Search .......................... 174/59, 60, DIG. 9; 361/610, 724, 725, 726, 727, 826, 827, 828, 644, 645; 312/286, 311, 223.1; 379/325, 326, 327, 328, 329, 330; 248/27.1, 27.3; 439/536; 211/26

[56] References Cited

U.S. PATENT DOCUMENTS

| | | |
|---|---|---|
| Re. 34,955 | 5/1995 | Anton et al. . |
| 2,427,349 | 9/1947 | Boynton ................................ 439/536 |
| 4,382,155 | 5/1983 | Borin et al. ........................... 174/60 X |
| 4,480,449 | 11/1984 | Ghandeharizadeh . |
| 4,502,754 | 3/1985 | Kawa . |
| 4,595,255 | 6/1986 | Bhatt et al. . |
| 4,630,886 | 12/1986 | Lauriello et al. . |
| 4,673,246 | 6/1987 | Schembri . |
| 4,699,455 | 10/1987 | Erbe et al. . |
| 4,702,551 | 10/1987 | Coulombe . |
| 4,708,430 | 11/1987 | Donaldson et al. . |
| 4,728,171 | 3/1988 | Schofield et al. . |
| 4,747,020 | 5/1988 | Brickley et al. . |
| 4,748,540 | 5/1988 | Henneberg et al. . |
| 4,752,110 | 6/1988 | Blanchet et al. . |
| 4,765,710 | 8/1988 | Burmeister et al. . |
| 4,792,203 | 12/1988 | Nelson et al. . |
| 4,805,980 | 2/1989 | Mackenroth . |
| 4,818,054 | 4/1989 | George et al. . |
| 4,824,196 | 4/1989 | Bylander . |
| 4,861,134 | 8/1989 | Alameel et al. . |
| 4,962,989 | 10/1990 | Jung et al. . |
| 5,011,257 | 4/1991 | Wettengel et al. . |
| 5,024,498 | 6/1991 | Becker et al. . |
| 5,046,811 | 9/1991 | Jung et al. . |
| 5,066,149 | 11/1991 | Wheeler et al. . |
| 5,067,784 | 11/1991 | Debortoli et al. . |

FOREIGN PATENT DOCUMENTS

| | | |
|---|---|---|
| 0 293 183 | 11/1988 | European Pat. Off. . |
| 2 166 262 | 4/1986 | United Kingdom . |

OTHER PUBLICATIONS

Siecor, pp. 2.12–2.13 and 2.75 from *Fiber Distribution Center Product Family: Connector Panel Housings*, date unknown.

AT&T *Fiber Optics Products*, Feb. 1995, pp. 8A–20, 8C–52;8AC–53 and 8C–55.

AMP Incorporated Pamphlet, Sep. 1996, pp. 72, 75, and 76.

3M *Fiber Distribution Products* Pamphlet, pp. 190–191, date unknown.

*Primary Examiner*—Dean A. Reichard
*Attorney, Agent, or Firm*—Cantor Colburn LLP

[57] ABSTRACT

A rack mountable cable distribution enclosure. The cable distribution enclosure includes a tray that slides forwards and backwards out of the cable distribution enclosure. The tray incudes an adapter plate bracket which receives a plurality of adapter plates. The adapter plates are mounted in a horizontal orientation, parallel to the sliding tray. This reduces the height of the cable distribution enclosure for installations where less space is available. The adapter plate bracket is angled relative to the sliding tray to prevent bending of the cable.

5 Claims, 16 Drawing Sheets

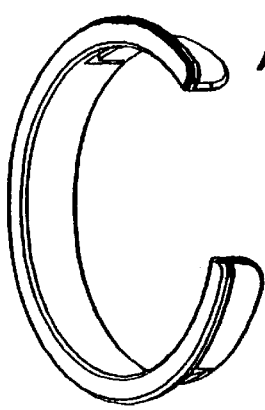
FIG. 5E
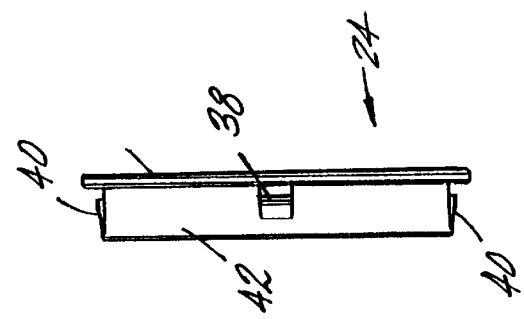
FIG. 5C
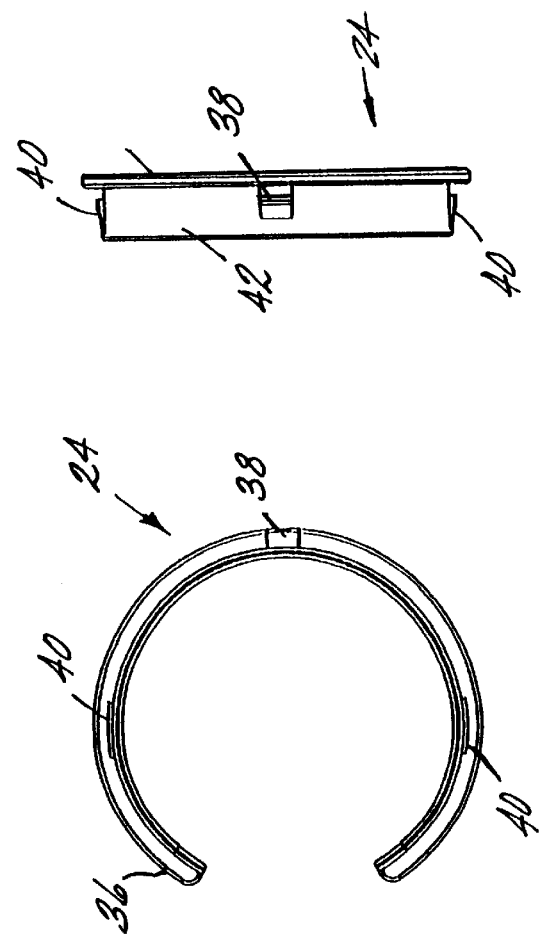
FIG. 5D
FIG. 5A
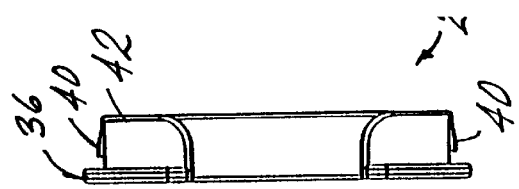
FIG. 5B

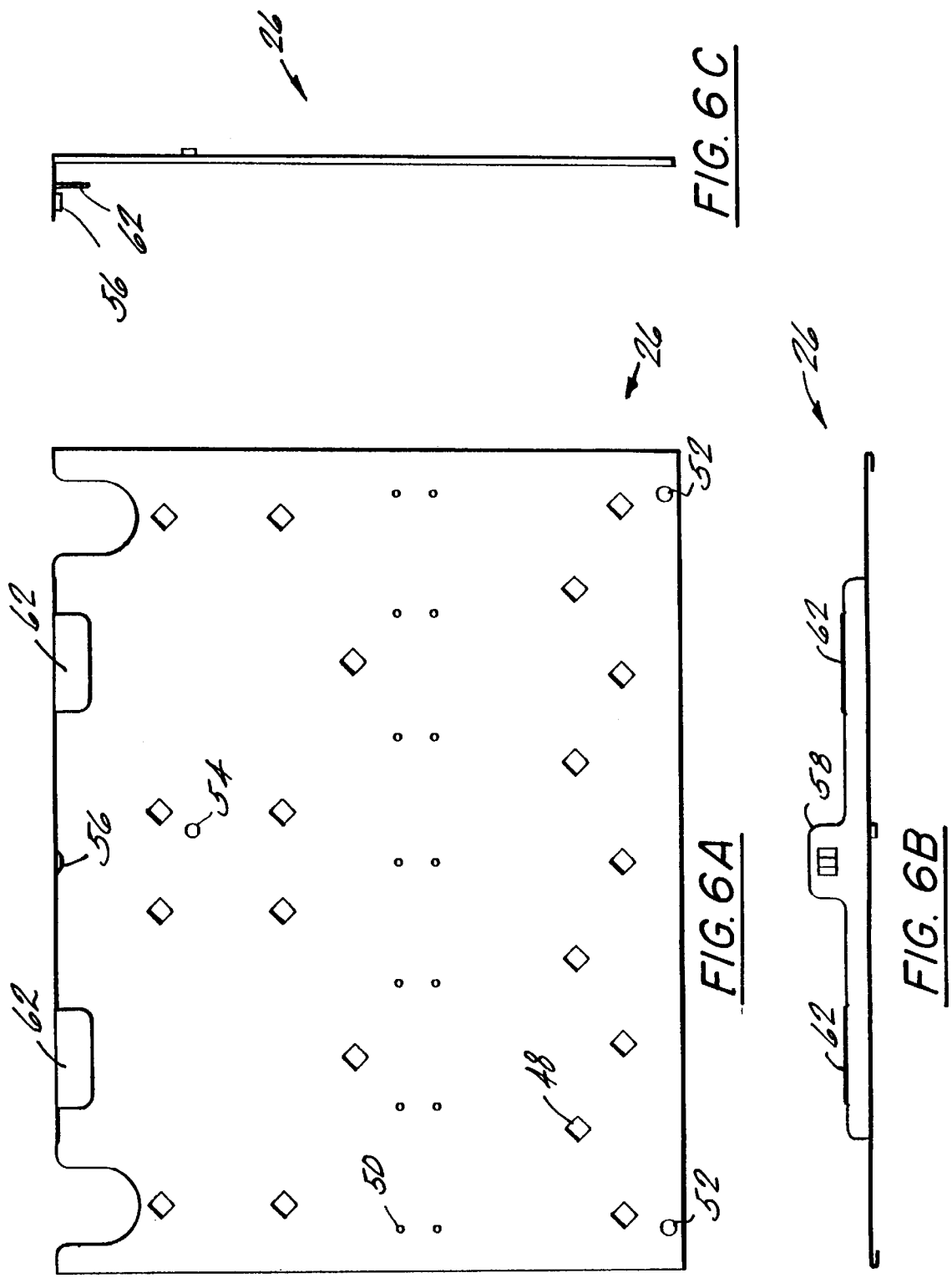

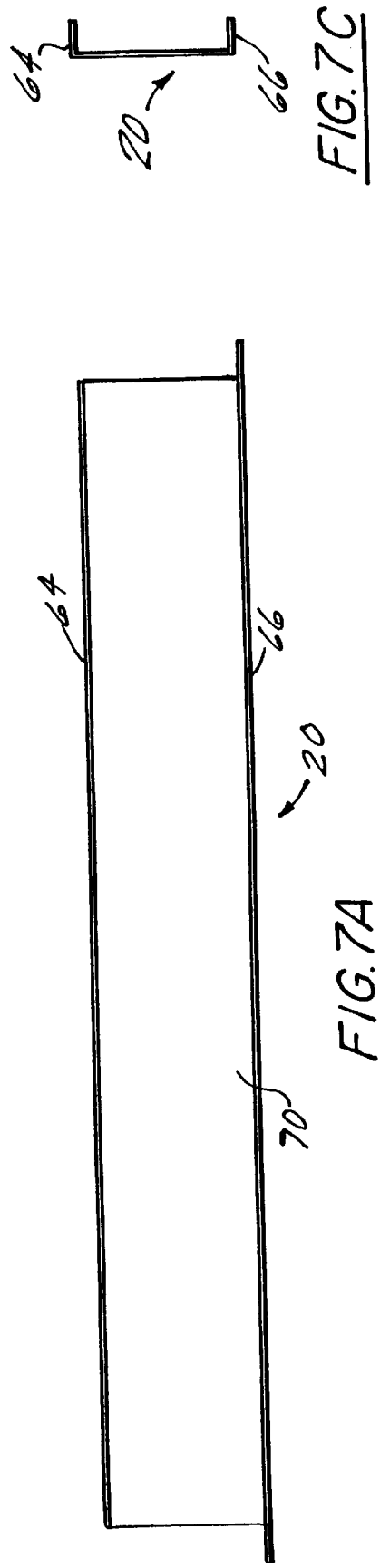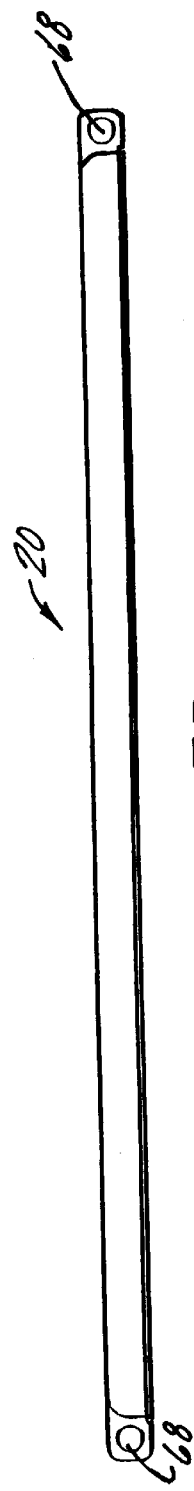

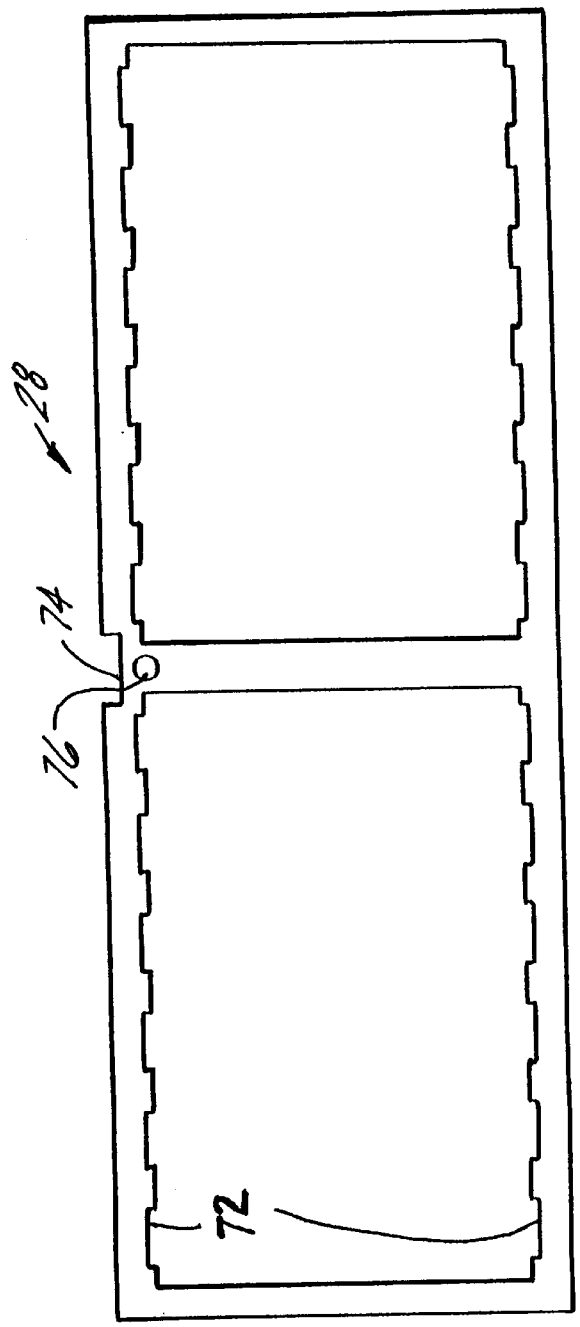
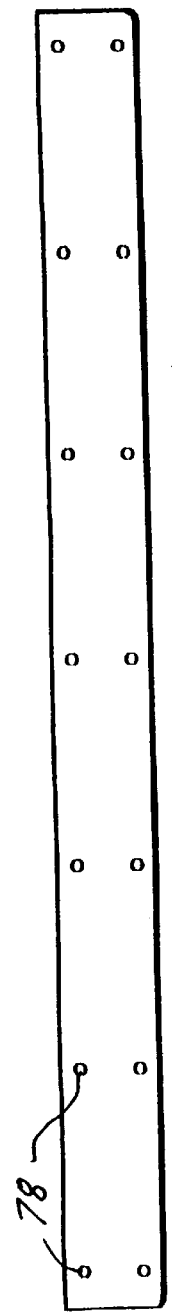
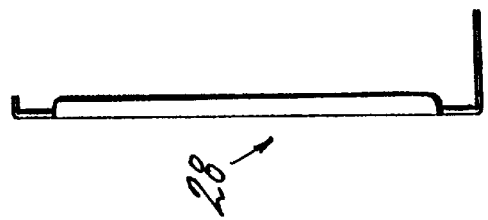

RACK MOUNTABLE CABLE DISTRIBUTION ENCLOSURE HAVING AN ANGLED ADAPTER PLATE BRACKET

CROSS REFERENCE TO RELATED APPLICATIONS

This application is a continuation-in-part of U.S. patent application Ser. No. 08/652,908, filed May 23, 1996 entitled "Rack Mountable Cable Distribution Enclosure."

BACKGROUND OF THE INVENTION

1. Field of the Invention

The invention relates generally to cable distribution enclosures and in particular to a cable distribution center that has a high cable density and provides easy access to cable adapters.

2. Prior Art

After cable (e.g. optical fiber) is brought into a building for use in transmitting signals for telephone (voice), displays (video), or computers (data), those signals must be distributed throughout the building to typically each desk that requires access to the information being transmitted. To facilitate that distribution, an enclosure is typically utilized to house and manage the dispersal of the optical fiber. In many cases, as many as 72 fibers are distributed within a single enclosure and several of these enclosures are attached to a rack. In larger systems, a room full of these racks serves as a central hub from which thousands of fibers are distributed. Due to the increasing need for more and more fibers, space has become an issue; hence the need for enclosures with the ability to effectively distribute a higher fiber count within basically the same volume has arisen.

SUMMARY OF THE INVENTION

The above-discussed and other drawbacks and deficiencies of the prior art are overcome or alleviated by the rack mountable cable distribution enclosure of the invention. The cable distribution enclosure provides a high-density fiber solution for terminating up to 144 fibers, all within a 4 RMS space on a 19" or 23" rack. The enclosure is made from high grade steel and both front and rear access doors are durable smoked polycarbonate. These front and rear doors utilize releasable hinges that can therefore be removed by activating the hinge release mechanism. Also, both of these doors are lockable by way of customer-supplied locks. Fiber entry is made available at both sides, at the front and rear of enclosure, and conveniently-located cable tie anchor points are provided for securing incoming cables.

A sliding tray facilitates front and rear adapter access via a unique system of push-pull latches and brackets. The fibers are connected through the use of snap-in adapter plates. Each adapter plate is capable of accommodating up to (6) duplex adapters (2 ports per adapter) such that, with all (12) plates installed, the fiber count=6×2×12=144. The 4 and 6-port adapter plates include molded-in icon pockets to assist in color coding and port identification. The mounting surface of the adapter plate is angled so as to minimize fiber bend radius and to also reduce the potential of eye damage by minimizing the chance of looking straight into the activated fibers while working around the cable distribution enclosure. These adapter plates are reversible to thus enable angling fiber cable to either the left or right.

The cable distribution enclosure provides an effective system for distributing and managing up to 144 fibers within the same rack space that is normally utilized for a maximum of 72 fibers. There are additional features designed into the cable distribution enclosure which, when compared to other 72-port enclosures, facilitate the installation of the fiber, improve upon management of the fibers, and/or reduce the manufacturing cost.

BRIEF DESCRIPTION OF THE DRAWINGS

Referring now to the drawings wherein like elements are numbered alike in the several FIGURES:

FIGS. 5A–5E are various views of a grommet;

FIGS. 6A–6C are various views of a sliding tray;

FIGS. 7A–7C are various views of a label holder panel;

FIGS. 8A–8C are various views of the adapter plate bracket;

DETAILED DESCRIPTION OF THE INVENTION

Figure 1:
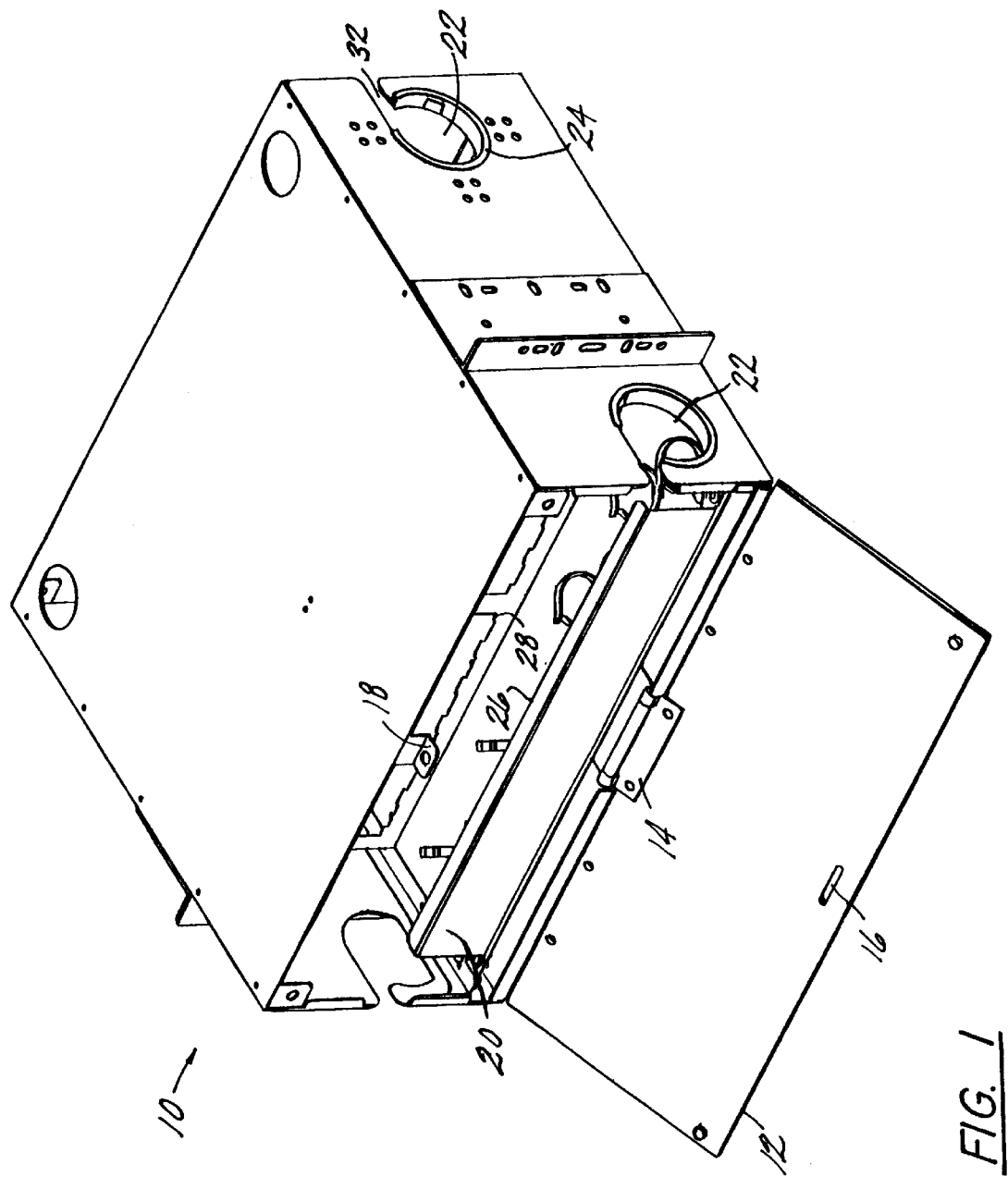
FIG. 1 is a perspective view of the cable distribution enclosure with the front cover open.

FIG. 1 is a perspective view of the cable distribution enclosure, shown generally at 10. A front door 12 is in the open position. The front door 12 is mounted to the body of the cable distribution enclosure by releasable hinge 14. The releasable hinge 14 allows the front door 12 to be removed entirely during service but prevents the front door 12 from being inadvertently removed. As shown in FIG. 1, the hinge 14 is mounted to the cable distribution enclosure 10 and door 12 so that the sliding tray 26 can be slid out of the cable distribution enclosure 10 without removing the door 12. The hinge 14 includes a built in spring mechanism that may be defeated to release the hinge 14 from the front door 12. A back door (not shown) is provided opposite the front door 12 with a similar defeatable hinge. A slot 16 is formed in the front door 12 which receives a hasp 18 provided on the top of the cable distribution enclosure 10. A label holder panel 20 provides an area for holding a plurality of labels that provide information regarding the cables in the cable distribution enclosure 10. A plurality of openings 22 are provided in the cable distribution enclosure 10 for allowing cables to enter and exit the cable distribution enclosure 10. As mentioned above, the cable distribution enclosure 10 is used as a distribution center for large numbers of cables. A grommet 24 is placed within each opening 22 and is described in more detail below. The base of the cable distribution enclosure 10 includes a sliding tray 26 which carries an adapter plate bracket 28. The adapter plate bracket 28 receives a plurality of adapter plates. The details of these elements are described below.

Figure 2:
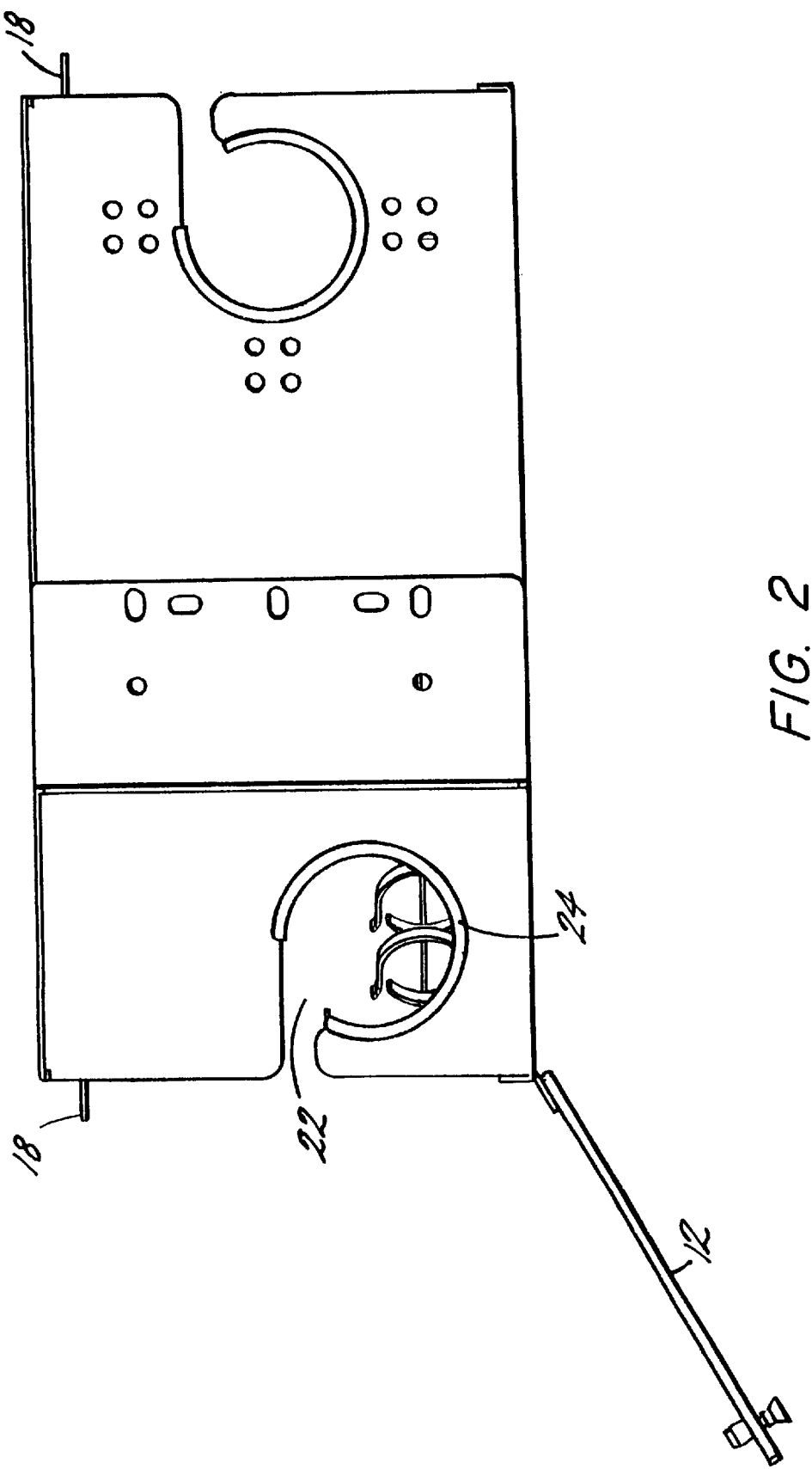
FIG. 2 is side view of the cable distribution enclosure with the front cover open.

FIG. 2 is a side view of the cable distribution enclosure 10 with the front door 12 open. As shown in FIG. 2, the rear of the cable distribution enclosure 10 includes a hasp 18 allowing the back door (not shown) to be locked. The use of lockable front and rear doors provides added security at both ends of the cable distribution enclosure 10. The user needs only provide a standard padlock to secure the cable distribution enclosure 10 and thus the cost of achieving a secure enclosure is minimal.

The opening 22 shown in FIG. 2 includes a circular region 30 and a straight region 32 which intersects the circular region at an arc of the circular region 30. Cables are inserted into the opening through the straight region 32 and placed into the circular region 30. The circular region 30 is large enough to hold 144 fiber cables which is the maximum density of the cable distribution enclosure 10. The grommet 24 protects the cables from the metal edges of the circular region 30 and is described in further detail below.

Figure 3:
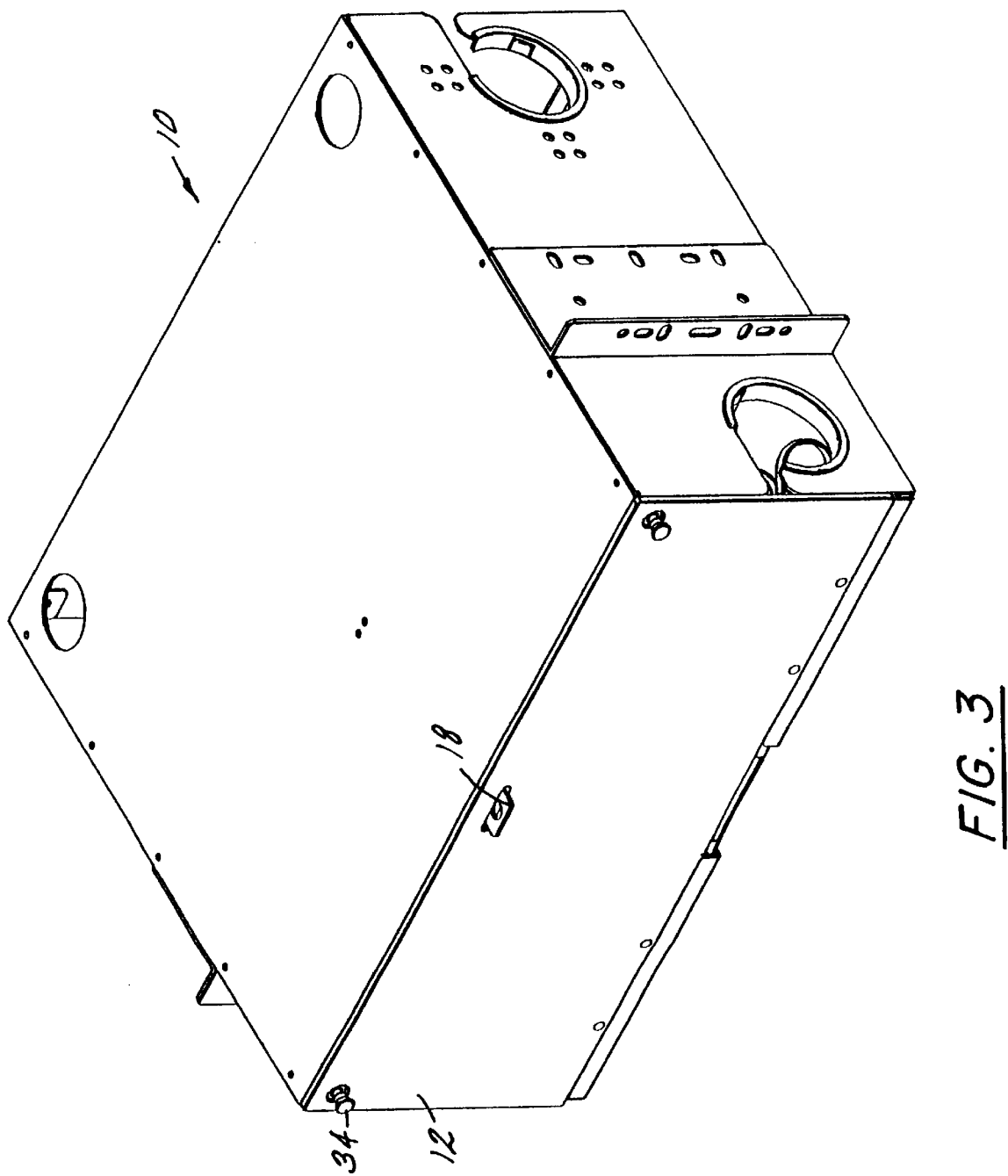
FIG. 3 is a perspective view of the cable distribution enclosure with the front cover closed.
Figure 4B:
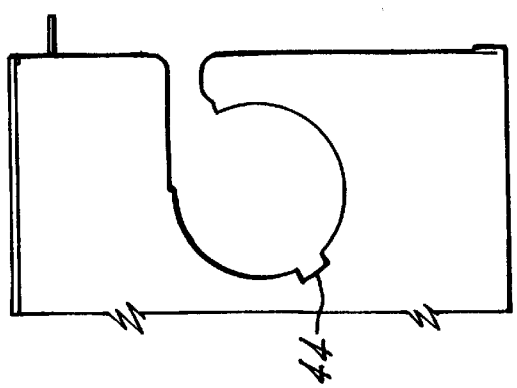
FIG. 4B is a side view of a portion of the cable distribution enclosure.
Figure 4A:
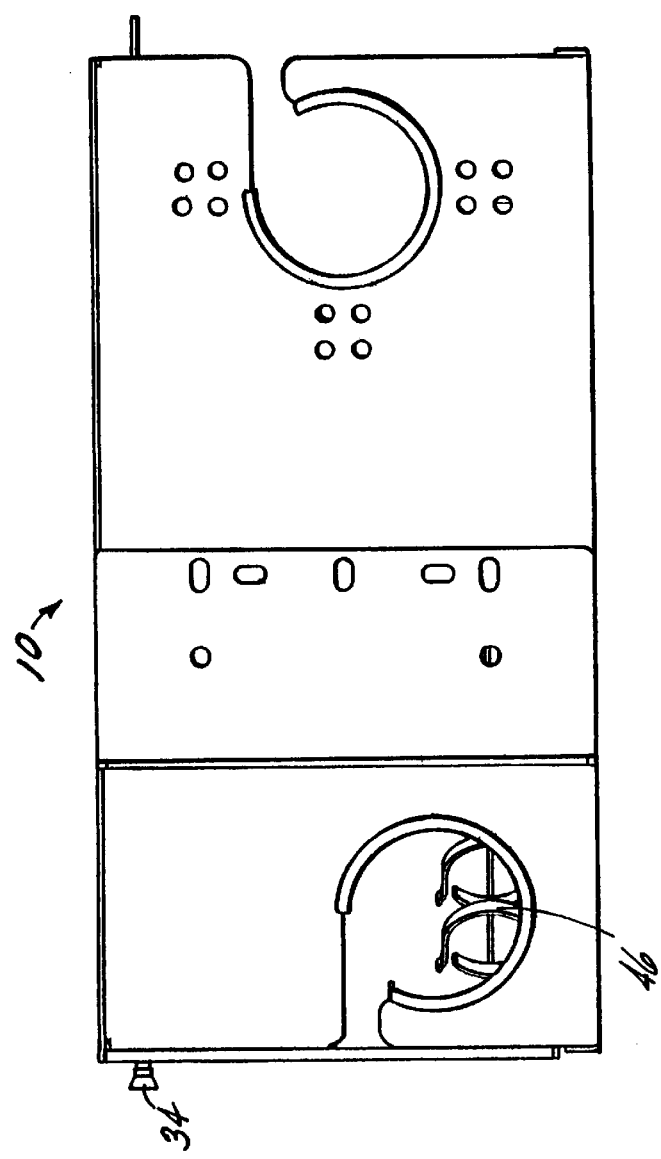
FIG. 4A is side view of the cable distribution enclosure with the front cover closed.

FIG. 3 is a perspective view of the cable distribution enclosure 10 with the front door 12 closed. As is shown, the hasp 18 extends beyond the front door 12 to allow for locking the cable distribution enclosure 10. When not locked, the front door 12 is held in place through conventional snap latch type connectors 34 at each corner of the door. The back door (not shown) is similar to the front door 12. FIG. 4A is a side view of the closed cable distribution enclosure 10 shown in FIG. 3. FIG. 4B is a side view of the opening 22 without the grommet 24. A notch 44 is formed in the opening 22 for aligning the grommet 24.

FIG. 5A is a bottom view of the grommet 24. The grommet 24 has a lip 36 that is placed on the outside of the circular opening 30. A wall 42 extends away from the lip 36 at a right angle to the lip 36. Flexible latches 40 are provided on the wall 42 to allow the grommet 24 to be snapped into the circular region 30. A protrusion 38 is aligned with a notch 44 shown in FIG. 4B formed in the circular opening 30. This protrusion 38 aligns the opening in the grommet 24 with the straight opening 32. The grommet 24 is designed to be universal and fit into all openings i.e. incoming and outgoing. Typically, cables enter the openings 22 formed in the rear of the cable distribution enclosure 10 and exit through the openings 22 in the front of the cable distribution enclosure 10. The grommet 24 is sized so as to accept 144 fiber optic cables. The depth of the wall 42 is limited so that extension of the wall 42 into the interior of the cable distribution enclosure 10 is minimized. The grommet 24 is also sized to accept a standard polymer cap which plugs into the center of the grommet 24 for dust prevention. FIGS. 5B–5E are assorted views of the grommet 24 and are self explanatory.

FIGS. 6A–6C are assorted views of the sliding tray 26 provided in the bottom of the cable distribution enclosure 10. As shown in the top view in FIG. 6A, the sliding tray 26 includes a plurality of openings 48 for receiving wire management clips 46 (shown partially in FIG. 4A). Towards the back of the sliding tray, a cable tie down 56 is formed in the sliding tray 26. As shown in FIG. 6B, the sliding tray 26 includes a raised portion 58. The cable tie down 56 is formed through a pressing operation at the raised portion 58. The pressing operation forms a band of metal having an opening at the rear of the sliding tray 26. A cable tie can then be placed through the opening in the cable tie down 56. The placement of the cable tie down 56 in the center of the sliding tray 26 allows the sliding tray 26 to pulled forward or backward without stressing the incoming cable attached at the cable tie down 56. The cable tie down 56 retains the incoming cable out of the way of the coiled slack fibers, and does not interfere with the sliding tray 26.

Towards the rear of the sliding tray 26, nearest the cable tie down opening 56, the openings 48 are arranged in circles. This allows slack cable entering from the rear of the cable distribution enclosure 10 to be coiled in a circular fashion in the wire management clips 46 that are inserted in the openings 48. A pair of tabs 62 are provided substantially parallel to the base of the sliding tray 26. Theses tabs 62 provide additional support for coiled cable. A series of holes 50 for mounting an adapter plate bracket are provided near the center of the sliding tray 26. A second series of openings 48 are provided at the front of the sliding tray 26 to hold additional wire management clips 46. The wire management clips 46 at the front of the tray are used to distribute cables exiting the cable distribution enclosure 10. Two holes 52 receive snap latch connectors that hold the label holder plate 20 to the sliding tray 26.

A hole 54 is formed near the rear of the sliding tray 26 for mounting a splice tray. When optical fibers are joined, either by fusing or mechanical devices, the section where the two fibers are joined is commonly placed in a splice tray. Typically, the splice tray is stored in a separate enclosure outside of the cable distribution enclosure. However, the cable distribution enclosure 10 of the present invention is designed so that the splice tray 60 may be attached to the sliding tray 26 and interfere only with a minimum number of wire management clips 46. The outline of the splice tray is shown as dotted line 60. This eliminates the need for a separate enclosure to contain the splice tray. The hole 54 may have a plastic nut pressed therein. A threaded rod and a wing nut may be used to mount the splice tray 60 to the sliding tray 26. FIG. 6C is a side view of the sliding tray 26.

FIGS. 7A–7C are assorted views of the label holder panel 20. The front face 70 of the label holder panel receives transparent pockets that hold labels that may be produced on a conventional printer. The transparent pockets (not shown) may be adhered to the label holder panel 20 through any conventional means such as adhesive tape. The label holder panel 20 includes two holes 68 (shown in FIG. 7B), which are aligned with holes 52 in the sliding tray 26. A conventional snap latch connector couples the label holder panel 20 to the sliding tray 26. This allows the label holder panel 20 to be removed during service of the cable distribution enclosure 10. The label holder panel 20 includes an upper lip 64 and a lower lip 66. The lower lip 66 provides a base which is mounted to the sliding tray 26. The upper lip provides for cable management. In the event that a large number of cables are exiting the front of the cable distribution enclosure 10, it may be more convenient to place the wires in the area formed by the upper lip 64, the face 70 and the lower lip 66. This prevents the user from having to run a large number of cables through the wire management clips 46 located in holes 48 near the front of the sliding tray 26.

FIGS. 8A–8C are assorted views of the adapter plate bracket 28. The adapter plate bracket 28 includes a plurality of interior recesses 72 and an exterior notch 74. A hole 76 allows the adapter plate bracket 28 to be connected to a latching mechanism described below. The interior recesses 72 receive adapter plates 92 described below. FIG. 8B is a view of the bottom of the adapter plate bracket 28 which includes a plurality of holes 78 that are aligned with holes 50 in the sliding tray 26. FIG. 8C is a side view of the adapter plate bracket 28.

Figure 9:
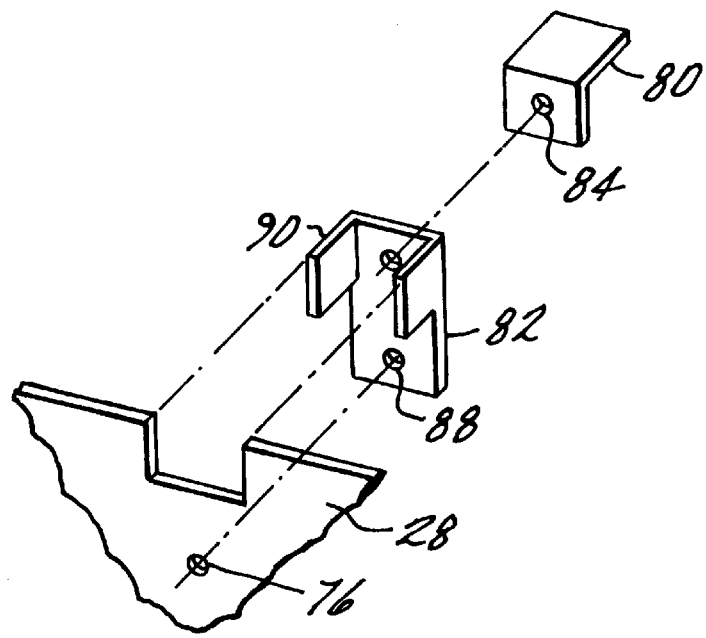
FIG. 9 is an exploded perspective view of the adapter plate bracket latching mechanism.
Figure 10:
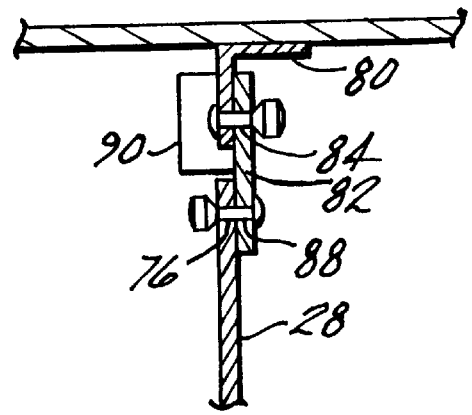
FIG. 10 is a cross sectional view of the adapter plate bracket latching mechanism.

FIGS. 9 and 10 illustrate the latching mechanism used to allow the sliding tray 26 to be locked in the center of the cable distribution enclosure 10, pulled out the front or pulled out the back. As shown in FIG. 9, the latching mechanism includes an L bracket 80 having a hole 84 and an intermediate bracket 82 having tabs 90, a first hole 86 and a second hole 88. The L bracket 80 is permanently attached to the top of the cable distribution enclosure 10. The rear surface of the L bracket 80 contacts the front surface of the intermediate bracket 82 and holes 84 and 86 are aligned. A snap-latch connector is placed through holes 84 and 86. The front surface of the intermediate bracket 82, below tabs 90, contacts the rear surface of adapter plate bracket 28. Holes 88 and 76 are aligned and a snap latch connector is placed through holes 76 and 88. The tabs 90 are positioned within the exterior notch 74. When both snap latches are engaged, the adapter plate bracket 28 is locked in a central position within the cable distribution enclosure 10.

If the user desires to pull the sliding tray 26 forward, the snap latch in holes 76 and 88 is removed and the sliding tray 26 may then move forward. The tabs 90 on the intermediate bracket 82 prevent the intermediate bracket 82 from rotating. When the sliding tray 26 is returned to the center position, the snap-latch is placed back in holes 76 and 88. To move the sliding tray 26 backwards, the snap-latch in holes 86 and 84 is removed. The sliding tray can then move towards the rear of the cable distribution enclosure 10. The tabs 90 contact the exterior notch 74 and prevent the intermediate bracket 82 from rotating.

FIGS. 11A–11E are various views of an adapter plate 92 for use with the adapter plate bracket 28 shown in FIG. 8A. In the prior art, a conventional "six-pack" (six port adapter plate) is secured to a bracket in the enclosure by two snap-latch connectors. This requires that two holes be drilled or punched in to the six port adapter plate at the proper diameter and location to enable the plates to be held by the installer in a position such that the snap latches, which are preassembled in the plates at the factory, are aligned with holes formed in the bracket. Only then can the snap latches be pushed into place to retain the plates to the bracket. The drawback to the prior art is that holes must be formed in the bracket and separate pieces, i.e. snap latches, are needed to mount the plate to the bracket. The adapter plate 92 shown in FIGS. 11A–11E overcomes these drawbacks.

Figure 11D:
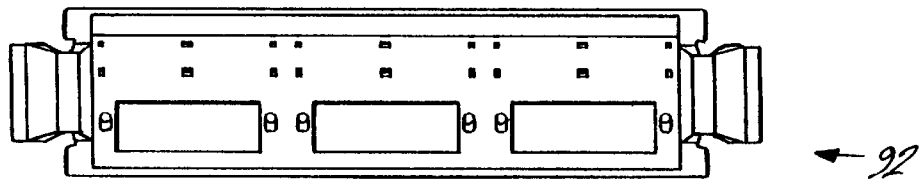
FIGS. 11A–11E are various views of the adapter plate.
Figure 11C:
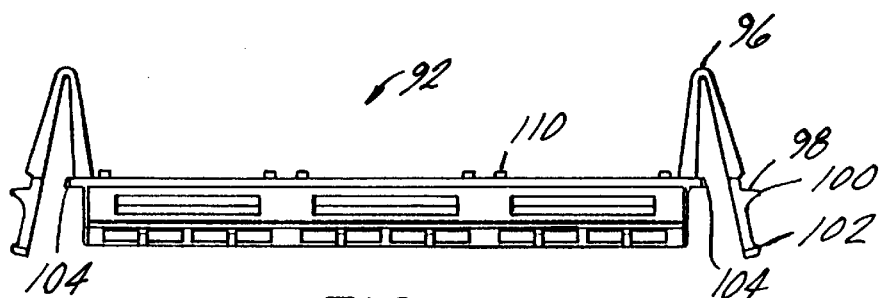
Figure 11A:
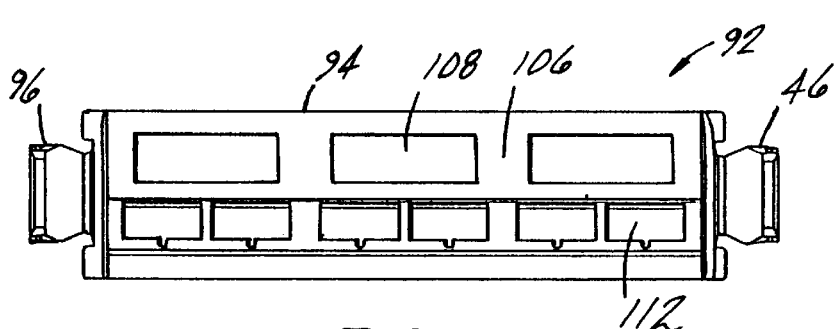
Figure 11E:
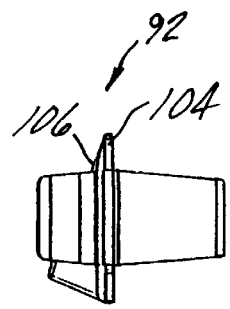
Figure 11B:
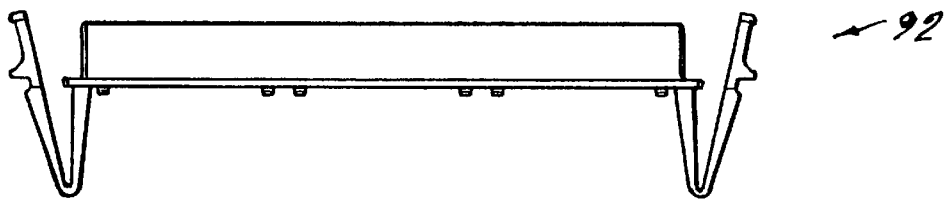

The adapter plate 92 shown in FIG. 11A has a body portion 94 and latch portions 96. The latch portion 96 is a V shaped member having one end attached to the body portion 94. Towards the second end a groove 98 is formed adjacent to a ridge 100. A release tab 102 is formed at the end of the V shaped member that is not attached to the body portion. The adapter plate 92 is attached to the adapter plate bracket 28 by placing the grooves 98 in two of the interior recesses 72. The adapter plate 92 is snapped into the interior recesses 72 in the adapter plate bracket 28 by simply positioning the adapter plate 92 at the adapter plate bracket 28 face and pushing the adapter plate forward until it snaps into place within the adapter plate bracket 28 opening. Three is no need to align snap latches with partially concealed holes or activate (push in) multiple snap latches as described in above in the conventional system.

The width of groove 98 is such that the adapter plate 92 fits within the interior recesses 72 in the adapter plate bracket 28. The adapter plate bracket 28 shown in FIG. 8A holds 12 adapter plates 92. To remove the adapter plate 92 from the adapter plate bracket 28, the user applies force on one or both of the release tabs 102. Force on either release tab 102 towards the center of the adapter plate 92 allows the adapter plate 92 to be tilted away from and out of the adapter plate bracket 28. One may also defeat both latch portions 96 by gripping the two release tabs 102 between two fingers and collapsing the release tabs 102 towards each other. Either single or double release tab compression is easier than deactivating (pull out) two snap latches. The adapter plate 92 is designed so that vertical motion along the major axis of the adapter plate 92 will not disengage the adapter plate 92 from the adapter plate bracket 28. When servicing adapters mounted in the adapter plate 92, the adapter plate 92 is often moved up or down as the service personnel is handling an adapter mounted in the adapter plate 92. A ridge 104 is formed under each latch portion 96. As the adapter plate 92 is moved up or down in the adapter plate bracket 28, the ridge 104 contacts the latching portion at approximately the back of groove 98. This prevents the adapter plate 92 from being moved a sufficient distance in the vertical axis to inadvertently disengage the adapter plate 92 from the adapter plate bracket 28.

The adapter plate 92 is also self locating in the horizontal direction within the adapter plate bracket 28. The interior recesses 72 formed in the adapter plate bracket 28 receive the groove 98 formed in the latching portion 96. The vertical edges of the interior recess 72 prevents the adapter plate 92 from sliding to the left or right and thus affirmatively locates the adapter plate 92 in the horizontal direction.

The adapter plate 92 has a mounting surface 106 having openings for receiving adapters. The mounting surface 106 is at an angle relative to the grooves 98. When the adapter plate 92 is mounted in the adapter plate bracket 28, the groove 98 is parallel to the front face of the adapter plate bracket 28. Thus, the mounting surface 106 is angled relative to the face of the adapter plate bracket 28. This angle provides several benefits. When one end of each of the fiber cables is connected to the adapters mounted in the adapter plate 92, which is mounted to the adapter plate bracket 28, the cable is then routed into wire management retainers and out of exit openings 22 formed in the front of the cable distribution enclosure 10. It is desirable to limit the bend radius of the fiber cable to 1.2" minimum so as to maintain optimized transmission of signals through the fiber core. The exit openings 22 at the front of the cable distribution enclosure 10 are in a plane orthogonal to the adapter plate bracket 28. Thus, without an angled mounting surface 106, the fibers must change direction by 90 degrees which could cause abrupt bends in the fiber. The angled mounting surface 106 reduces the angle between the fibers exiting an adapter mounted to the adapter plate 92 and the exit openings 22 formed in the front of the cable distribution enclosure 10. This reduces bending of the fibers and prevents damage to the fibers.

A second benefit of the angled mounting surface 106 is eye safety. When a laser light source is utilized for signal transmission through the fiber core, it can be a safety hazard to look directly into the fiber. The angled mounting surface 106 directs the laser light away from the opening of the cable distribution enclosure 10 and thus reduces the likelihood that one will look directly into the laser light being emitted from the fiber mounted in the adapter plate 92.

The adapter plate 92 is also reversible in that it may be placed in the adapter plate bracket 28 in either vertical orientation. This allows the adapter plate 92 to be oriented to the left or the right depending upon the angular relationship between the mounting surface 106 and the adapter plate bracket 28. If all the fibers must be routed to the left front opening 22 of the cable distribution enclosure 10, all the adapter plates 92 may be inserted with a left facing orientation. Of course, any percentage of the adapter plates 92 may be orient right and left given the routing requirements.

The adapter plate 92 includes a plurality of openings 108 formed in the mounting surface 106. FIG. 11A shows three openings 108 for receiving duplex adapters, each carrying two fibers. Of course, the openings 108 may have different shapes and sizes depending upon the particular adapters to be mounted therein. On the rear of the mounting surface, cylindrical posts 110 are formed that provide multiple benefits when mounting adapters to the adapter plate 92. In conventional systems, the method for securing a fiber adapter is via the use of 2 screws fed through clearance holes in the adapter flanges and threaded into 2 tapped holes in the mounting surface. The cylindrical posts 110 eliminate the need for screws and costly tapped holes. The post 110 is sized so that it fits through a hole formed in the flange of an adapter and the post length is greater than the flange thickness. Once the adapter is installed against the mounting surface 106, with the posts 110 through the holes in the adapter flange, the tops of the posts 110 are mechanically swaged over to effect retention of the adapter to the mounting surface 106. The time to install the adapter to the adapter plate 92 is reduced and cost is reduced by the elimination of screws and tapped holes. The posts 110 may be used with a variety of adapters, and is particularly useful for adapters that do not include mounting clips.

Certain adapters include a metal mounting clip which is designed to mount the adapter to a panel opening. These adapters, however, have a tendency to rock within the panel opening. The posts 110 serve to eliminate or greatly reduce the rocking action of the clips caused by clearance between the clip and the panel. The posts 110, once within the holes in the flange of the adapter, limit the adapter rocking because of restriction provided by the presence and fit of the posts 110. It is understood that the posts 110 may be other than cylindrically shaped, as long as the posts 110 fit through flange holes in the adapter.

The adapter plate 92 also includes recessed pockets 112, integral to the adapter plate 92, that accommodate snap-fit, removable, color-coded tabs. Theses tabs are standardized and are available in a variety of colors and include an icon on one or both sides (such as phone, computer, etc.). The recessed pockets 112 enable full color coding and/or function identification for each port on a 6-port adapter plate 92.

Although FIG. 11A shows openings 108 accommodate 3 duplex adapters or 6 fiber ports. In an alternative embodiment, the adapter plate 92 holds 6 duplex adapters for a total of 12 fiber ports. The adapter plate bracket 28 can hold 12 adapter plates 92 and thus the total density for the cable distribution enclosure 10 is 144 fibers.

The cable distribution enclosure described above positions the adapter plates 92 in a vertical orientation, that is, perpendicular to the planar surface of sliding tray 26. This provides for high fiber capacity but also consumes 4 rack mount space (RMS) due to the height of each adapter plate 92. For installations where there is less rack space available and fewer ports are needed, the cable distribution enclosure 200 shown in FIG. 12 may be utilized.

Figure 12:
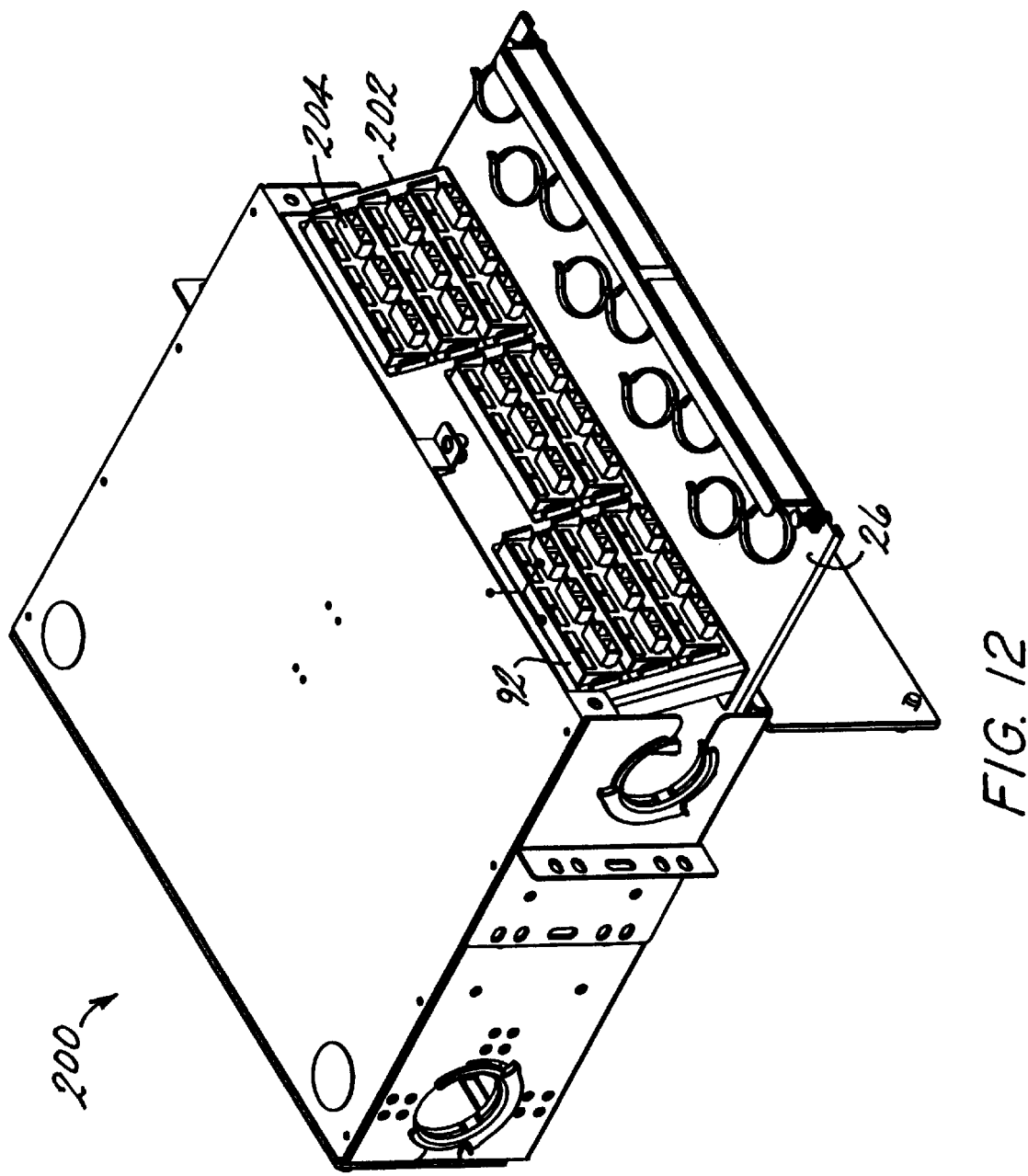
FIG. 12 is a perspective view of a cable distribution enclosure in an alternative embodiment of the invention.
Figure 13:
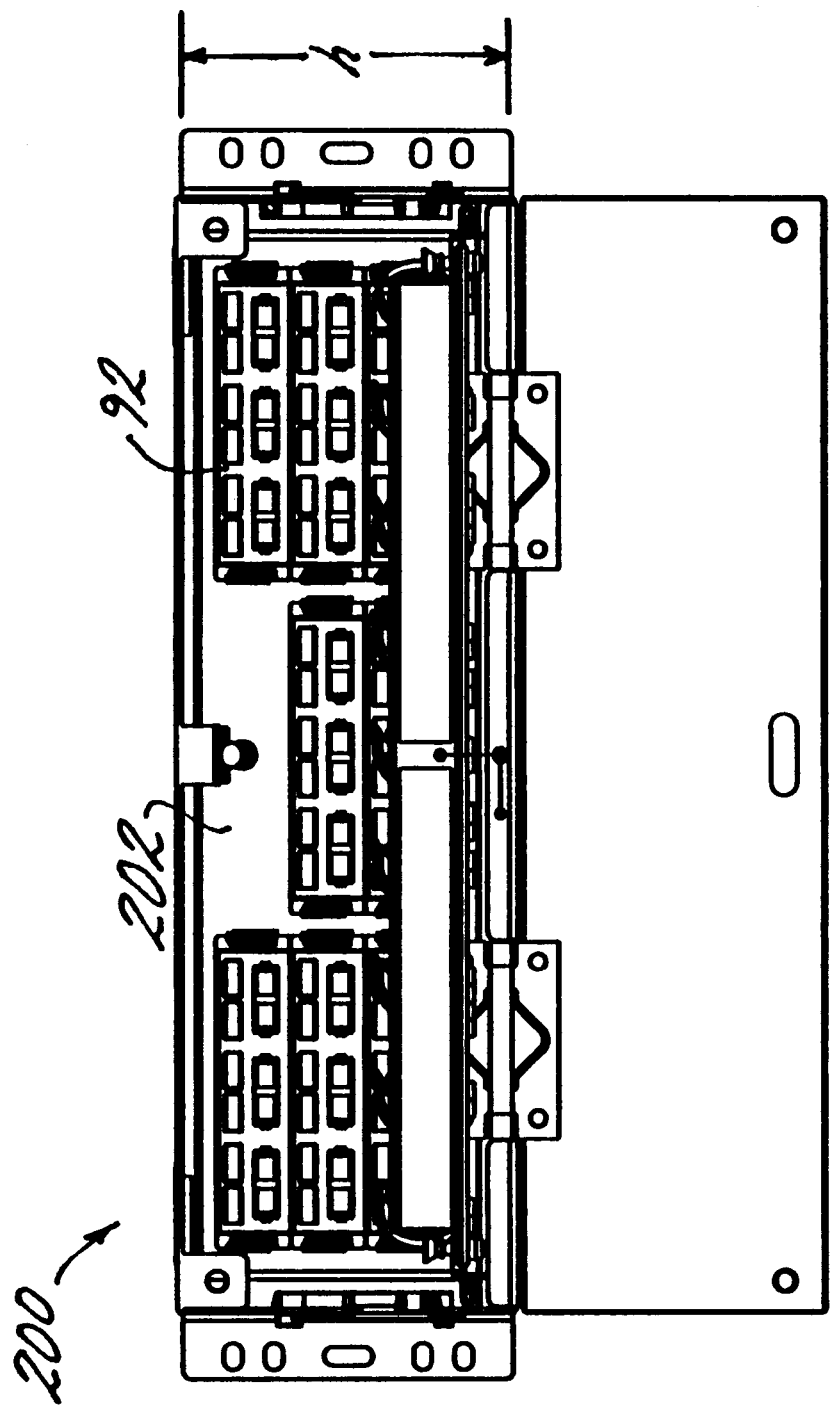
FIG. 13 is a front view of the cable distribution enclosure of FIG. 12.
Figure 14:
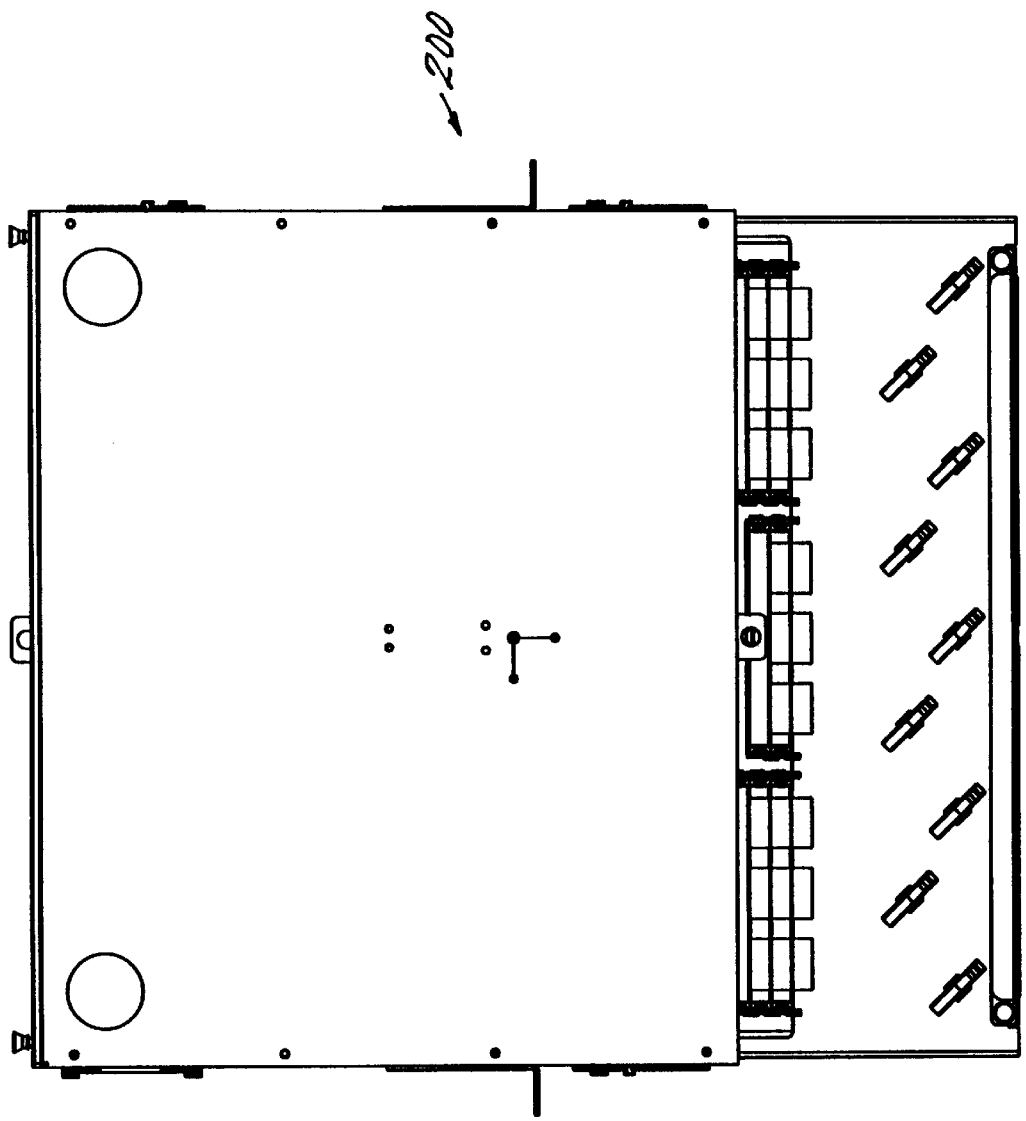
FIG. 14 is a top view of the cable distribution enclosure of FIG. 12.

As shown in FIG. 12, the cable distribution enclosure 200 is similar to cable distribution enclosure 10 and identical elements are given the same reference numeral. The cable distribution enclosure 200 includes sliding tray 26 having an adapter plate bracket 202 mounted thereto. A significant difference between cable distribution enclosure 10 and cable distribution enclosure 200 is that the adapter plates 92 are positioned horizontally such that the longitudinal axis of the adapter plate is parallel to a planar surface of the sliding tray 26. This reduces the height of the cable distribution enclosure 200, shown in FIG. 13 as h, and allows the cable distribution enclosure 200 to fit in less rack space. In the embodiment shown in FIG. 12, the adapter plate bracket 202 holds eight adapter plates 92, each of which can hold 12 ports, for a total of 96 ports. Spacing the adapter plates 92 reduces the density of adapters 204 and facilitates connection to and disconnection from adapters 204.

Positioning the adapter plates 92 parallel to the sliding tray 26 reduces the height of the cable distribution enclosure 200 but creates difficulties in optical fiber exiting the adapters 204 at the appropriate angle. If the adapter plate bracket 202 was perpendicular to the sliding tray 26, the optical fibers attached to the connectors which mate to the adapters 204 mounted in the adapter plates 92 would contact the tray 26 or the top, interior of the cable distribution enclosure 200. Contact with the top, interior of the cable distribution enclosure 200 or with the sliding tray 26 is detrimental because this contact can cause micro bending in the optical fiber that can result in degradation of the transmitted signal.

Figure 15:
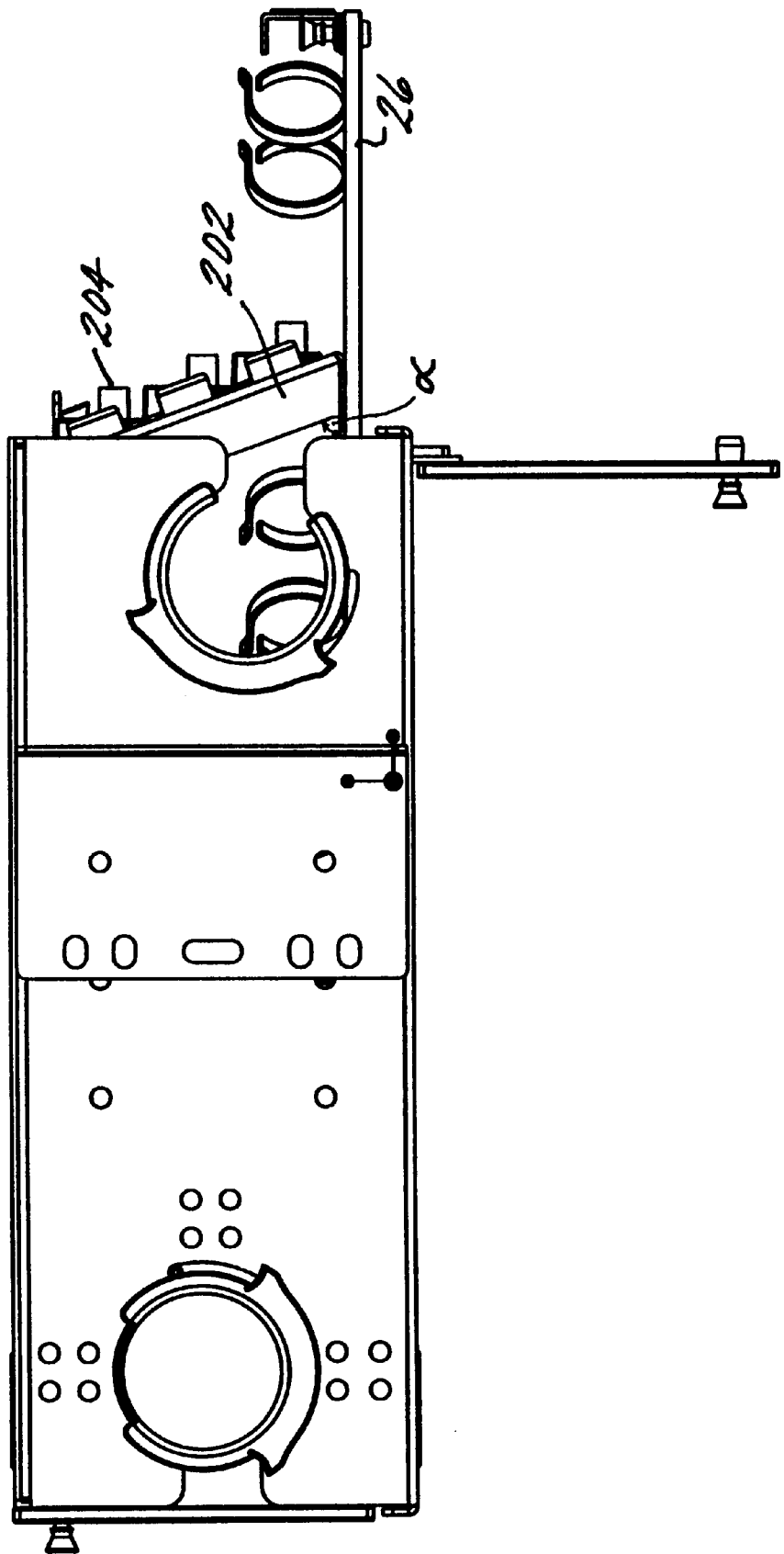
FIG. 15 is a side view of the cable distribution enclosure of FIG. 12.

To alleviate these problems, the adapter plate bracket 202 is positioned at an acute angle α relative to a planar surface of the sliding tray 26. The angle α is shown in FIG. 15. In an exemplary embodiment, the acute angle between the adapter plate bracket 202 and the sliding tray 26 is substantially equal to the angle between mounting surface 106 of adapter plate 92 and groove 98. Because the grooves 98 are parallel to the surface of the adapter plate bracket 202, in this embodiment, the angle between the adapter plate bracket 202 and the sliding tray 26 is substantially equal to the angle between the planar mounting surface 106 and the surface of the adapter plate bracket 202. The adapters 204 mounted in the adapter plates 92 extend substantially parallel to the sliding tray 26. Accordingly, the optical fibers attached to the connectors which mate to the adapters 204 mounted in the adapter plates 92 exit the adapters 204 parallel to the sliding tray 92 which prevents the cable from contacting the top, interior of the cable distribution enclosure 200 or the sliding tray 26 and eliminates the likelihood of micro bending.

Figure 16:
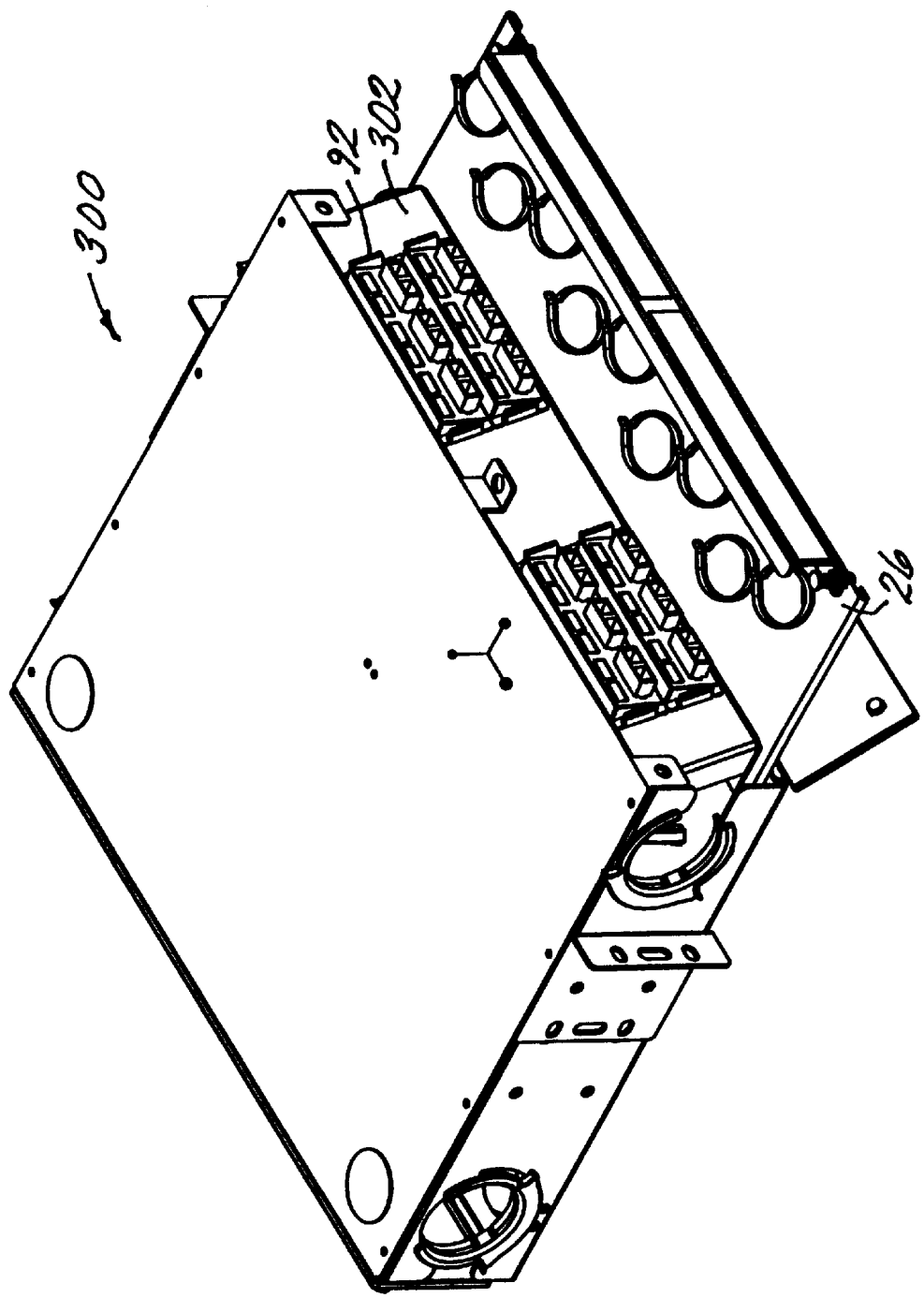
FIG. 16 is a perspective view of a cable distribution enclosure in yet another embodiment of the invention.
Figure 17:
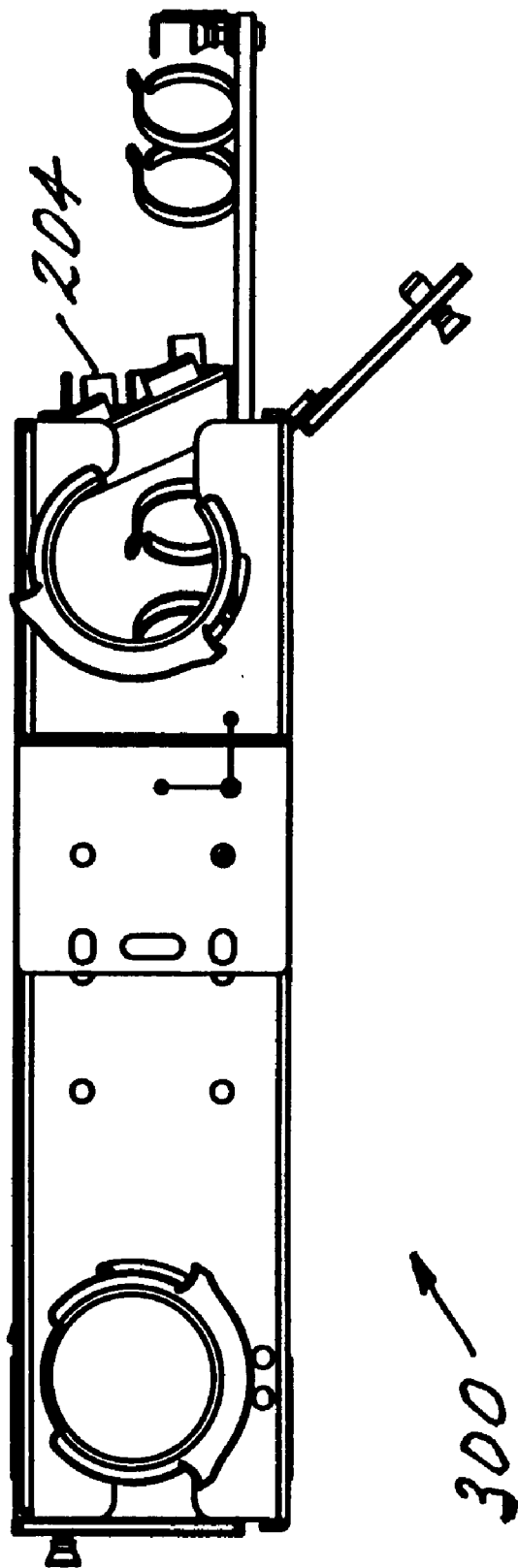
FIG. 17 is a side view of the cable distribution enclosure of FIG. 16.

FIG. 16 is an alternative embodiment in which a cable distribution enclosure 300 includes only four adapter plates 92 to further reduce the height of the cable distribution enclosure 300. As described above with respect to cable distribution enclosure 200, the adapter plate bracket 302 in FIG. 16 is positioned at an acute angle relative to sliding tray 26. FIG. 17 is a side view of the cable distribution enclosure 300 illustrating an exemplary embodiment in which the adapters 204 exit the adapter plates 92 substantially parallel to the sliding tray 26. Cable distribution enclosure 200 and cable distribution enclosure 300 use the same adapter plates 92 as the cable distribution enclosure 10. This reduces the complexity in inventory and allows a single adapter plate 92 to be used with multiple products.

The cable distribution enclosure of the present invention provides a high density cable distribution enclosure. The sliding tray allows access to the front or back of an adapter plate bracket where a plurality of adapter plates are mounted. The adapter plates have a latching mechanism on each end that allows for easy installation to and removal from the adapter plate bracket. An angled mounting surface on the adapter plate reduces the bend needed to route the fiber out of the cable distribution enclosure.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cable distribution enclosure comprising:

a tray having a planar surface;

an adapter plate bracket mounted to said tray on said planar surface, said adapter plate bracket being positioned at an acute angle relative to said planar surface; and an adapter plate for receiving cable adapters mounted in said adapter plate bracket.

2. The cable distribution enclosure of claim 1 wherein an axis of said adapter plate is parallel to said planar surface.

3. The cable distribution enclosure of claim 2 wherein said axis is a longitudinal axis of said adapter plate.

4. The cable distribution enclosure of claim 1 wherein said adapter plate has a planar mounting surface positioned at a first angle relative to a surface of said adapter plate bracket.

5. The cable distribution enclosure of claim 4 wherein said first angle is substantially equal to said acute angle.

* * * * *